US009353863B2

United States Patent
Yang et al.

(10) Patent No.: US 9,353,863 B2
(45) Date of Patent: *May 31, 2016

(54) WRIST PIN AND METHOD OF REDUCING WEAR BETWEEN MEMBERS THEREOF, CONNECTING ROD, PISTON AND METHODS OF CONSTRUCTING SAME

(71) Applicant: Federal-Mogul Corporation, Southfield, MI (US)

(72) Inventors: Qingmin Yang, Ann Arbor, MI (US); Andrew Miller, Plymouth, MI (US); Frank Zlamal, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/030,291

(22) Filed: Sep. 18, 2013

(65) Prior Publication Data
US 2014/0013939 A1 Jan. 16, 2014

Related U.S. Application Data

(62) Division of application No. 13/434,700, filed on Mar. 29, 2012, now Pat. No. 8,539,927, which is a division of application No. 12/488,853, filed on Jun. 22, 2009, now Pat. No. 8,286,607.

(60) Provisional application No. 61/075,075, filed on Jun. 24, 2008.

(51) Int. Cl.
*F16J 1/14* (2006.01)
*F16J 1/16* (2006.01)
(Continued)

(52) U.S. Cl.
CPC .. *F16J 1/16* (2013.01); *F16C 7/023* (2013.01); *F16C 9/04* (2013.01); *Y10T 29/49249* (2015.01);
(Continued)

(58) Field of Classification Search
CPC ............ F16J 1/12; F16J 1/14; F16J 1/16; F16J 1/18; F16J 1/20; F16C 7/023; F16C 9/04; Y10T 29/49288; Y10T 29/49249; Y10T 29/49266; Y10T 74/2162; Y10T 74/2173; Y10T 74/2142
USPC ............................ 123/193.6; 92/187–191
See application file for complete search history.

(56) References Cited

U.S. PATENT DOCUMENTS 1,288,786 A 12/1918 Wilschewski
1,395,946 A 11/1921 Clemons
(Continued)

FOREIGN PATENT DOCUMENTS

JP 61172254 U 10/1986
JP 07-006559 U 1/1995
KR 1020040061091 A 7/2004

*Primary Examiner* — Marguerite McMahon
(74) *Attorney, Agent, or Firm* — Robert L. Stearns; Dickinson Wright, PLLC

(57) ABSTRACT

A wrist pin and method of reducing wear between members thereof, a piston, a connecting rod, and methods of construction thereof are provided. The wrist pin has a first portion extending between opposite ends configured for receipt in piston pin bores and a second portion extending between opposite ends configured for receipt in the pin bores. The second portion is configured for relative movement with the first portion. The piston includes a piston body having axially aligned pin bores, wherein at least one of the pin bores has a feature to prevent relative rotation of a wrist pin member. The connecting rod includes a connecting rod body having small end bore. The small end bore has a contour to allow relative rotation of a first wrist pin member therein and a feature to prevent relative rotation of a second wrist pin member therein.

10 Claims, 5 Drawing Sheets

(51) Int. Cl.
*F16C 7/02* (2006.01)
*F16C 9/04* (2006.01)

(52) U.S. Cl.
CPC ...... *Y10T 29/49266* (2015.01); *Y10T 29/49288* (2015.01); *Y10T 74/2142* (2015.01); *Y10T 74/2162* (2015.01); *Y10T 74/2173* (2015.01)

(56) References Cited

U.S. PATENT DOCUMENTS

| | | | |
|---|---|---|---|
| 1,489,111 A | | 4/1924 | Blackshear |
| 1,623,972 A | | 4/1927 | Pierce |
| 1,718,963 A | | 7/1929 | Knudsen |
| 1,885,538 A | | 11/1932 | Loeb |
| 2,770,511 A | | 11/1956 | Powell |
| 2,806,752 A | * | 9/1957 | Ginn .............................. 403/153 |
| 2,849,266 A | * | 8/1958 | Glockl ........................... 403/155 |
| 3,161,185 A | | 12/1964 | Justinien |
| 4,445,800 A | | 5/1984 | Walker |
| 4,548,125 A | | 10/1985 | Huther |
| 4,572,058 A | | 2/1986 | Hinz et al. |
| 4,880,330 A | | 11/1989 | Mielke |
| 5,327,813 A | | 7/1994 | DeBell |
| 5,791,302 A | | 8/1998 | Ma |
| 5,850,777 A | | 12/1998 | Marklin et al. |
| 5,865,070 A | | 2/1999 | Bornhorst et al. |
| 6,062,733 A | | 5/2000 | Cobble |
| 6,408,813 B1 | | 6/2002 | Wilksch et al. |
| 6,550,138 B2 | | 4/2003 | Billimack et al. |
| 8,286,607 B2 | | 10/2012 | Yang et al. |
| 2006/0096557 A1 | | 5/2006 | Christain et al. |
| 2009/0145394 A1 | | 6/2009 | Nigro et al. |
| 2014/0260961 A1 | * | 9/2014 | Rediker, Jr. ..................... 92/208 |

* cited by examiner

WRIST PIN AND METHOD OF REDUCING WEAR BETWEEN MEMBERS THEREOF, CONNECTING ROD, PISTON AND METHODS OF CONSTRUCTING SAME

CROSS-REFERENCE TO RELATED APPLICATION

This application is a divisional application of U.S. Divisional application Ser. No. 13/434,700, filed Mar. 29, 2012 and of U.S. application Ser. No. 12/488,853, filed Jun. 22, 2009, which claims priority to U.S. Provisional Application Ser. No. 61/075,075, filed Jun. 24, 2008, which are incorporated herein by reference in their entirety.

BACKGROUND OF THE INVENTION

1. Technical Field

This invention relates generally to piston assemblies, and more particularly to wrist pins, pistons, connecting rods and piston assemblies therewith and to their respective methods of construction and assembly.

2. Related Art

Internal combustion engines are known to have piston assemblies including a piston, a connecting rod and a wrist pin. The wrist pin attaches the piston to the connecting rod for translation of the piston within a cylinder bore in response to rotation of a crankshaft and combustion within the cylinder bore. Typically, the piston has a pair of pin bosses with axially aligned cylindrical pin bores configured for receipt of cylindrical ends of the wrist pin. The connecting rod has one end configured for attachment to a crankshaft and a small end with a cylindrical small end bore configured for receipt of the cylindrical wrist pin therethrough. Accordingly, the wrist pin couples the connecting rod to the piston.

In an effort to reduce friction between the wrist pin and the pin bores and the wrist pin and the small end bore of the connecting rod, typically a suitable bearing material is incorporated in the pin bores and the small end bore. Although the bearing material can assist in reducing friction, inevitably wear results to the bearing surfaces of the wrist pin and the respective bores. The wear generally results due to a lubrication film breakdown between the bearing surfaces. The lubrication film breakdown results generally from the excessive pressures generated between the bearing surfaces, the relative rotating and/or oscillating movement between the bearing surfaces, an insufficient supply of lubrication reaching the bearing surfaces and from exposure of the bearing surfaces and the lubrication to high heat.

In addition to ultimate failure of the bearing surfaces, another undesirable phenomenon typically results from the breakdown of lubrication. Noise typically is generated between the bearing surfaces of the piston pin bores, the wrist pin and the connecting rod when the lubrication film is diminished. The lubrication film breakdown results in excessive clearance between the components, and thus, insufficient damping occurs between mating bearing surfaces.

In an effort to minimize the negative consequences discussed above, considerable care is generally taken during manufacture of the bearing surfaces of the piston pin bores, the connecting rod small end bore and the wrist pin. In order to minimize breakdown of the lubrication film, more clearance needs to be incorporated between the respective bearing surfaces. However, in order to reduce the onset of noise, the clearance between the respective bearing surfaces needs to be minimized. As such, in order to attain the enhanced lubrication and reduced noise generation desired, precise diameters and surfaces finishes of the bearing surfaces over a relatively narrow tolerance range need to be attained, such as in tightly controlled machining operations, e.g., grinding operations. As such, the costs associated with the manufacture of these parts is relatively high in comparison to parts requiring less precision. Although the manufacturing processes have improved, thereby allowing for more precise fabrication over narrow tolerance ranges, the ever increasing demands of modern engines, including higher cylinder pressures and engine speeds, and the ever increasing environmental regulations for reduced engine emissions and increased fuel economy, make it difficult or impossible to attain clearances and sufficient surface finishes between the respective bearing surfaces to combat the operating environment of the modern engine while in use, such as extreme pressures and temperatures, for example.

SUMMARY OF THE INVENTION

According to one aspect of the invention, a wrist pin configured for receipt in axially aligned pin bores of a piston body to couple a connecting rod to the piston body is provided. The wrist pin has a first portion extending between opposite ends configured for receipt in the pin bores and a second portion extending between opposite ends configured for receipt in the pin bores. The second portion is configured for relative movement with the first portion.

In accordance with yet another aspect of the invention, a piston is provided. The piston includes a piston body having a pair laterally spaced pin bosses. The pin bosses have axially aligned pin bores, wherein at least one of the pin bores has a feature to prevent relative rotation of a wrist pin member.

In accordance with yet another aspect of the invention, a connecting rod for operable attachment to a piston is provided. The connecting rod includes a connecting rod body having small end bore. The small end bore has a contour to allow relative rotation of a first wrist pin member therein and a feature to prevent relative rotation of a second wrist pin member therein.

In accordance with yet another aspect of the invention, a method of constructing a piston is provided. The method includes forming a piston body with an upper crown and a pair of laterally spaced pin bosses depending from the upper crown. Further, forming a wrist pin bore in each of the pin bosses. Further yet, providing a feature within at least one of the wrist pin bores to prevent relative rotation of a wrist pin member within the wrist pin bores.

In accordance with yet another aspect of the invention, a method of constructing a wrist pin for receipt in axially aligned pin bores of a piston body is provided. The method includes forming a first portion extending between opposite ends configured for receipt in the pin bores and forming a second portion extending between opposite ends configured for receipt in the pin bores wherein the second portion is formed from a separate piece of material from the first portion. Further, configuring the first portion for engagement with the second portion and for relative movement with the second portion.

In accordance with yet another aspect of the invention, a method of constructing a connecting rod for operable attachment to a piston is provided. The method includes forming a connecting rod body and forming a small end bore in the body. Then, forming a portion of the small end bore with a contour to allow relative rotation of a first wrist pin member, and further, providing a feature in another portion of the small end bore to prevent relative rotation of a second wrist pin member.

In accordance with yet another aspect of the invention, a method of reducing wear between first and second wrist pin members of a wrist pin is provided. The method includes collecting sufficient oil regardless of an existing clearance value between the wrist pin and a piston pin bore and regardless of an existing clearance value between the wrist pin and a small end bore of a connecting rod. Further, increasing the contact area between the first and second wrist pin members to reduce contact pressure and enable improved lubrication and damping characteristics between the first and second wrist pin members. Further yet, providing a lubrication interface between the first and second wrist pin members to maintain supplied oil with limited contact pressure between the first and second wrist pin members and, providing a reduced sliding speed between the first and second wrist pin members.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
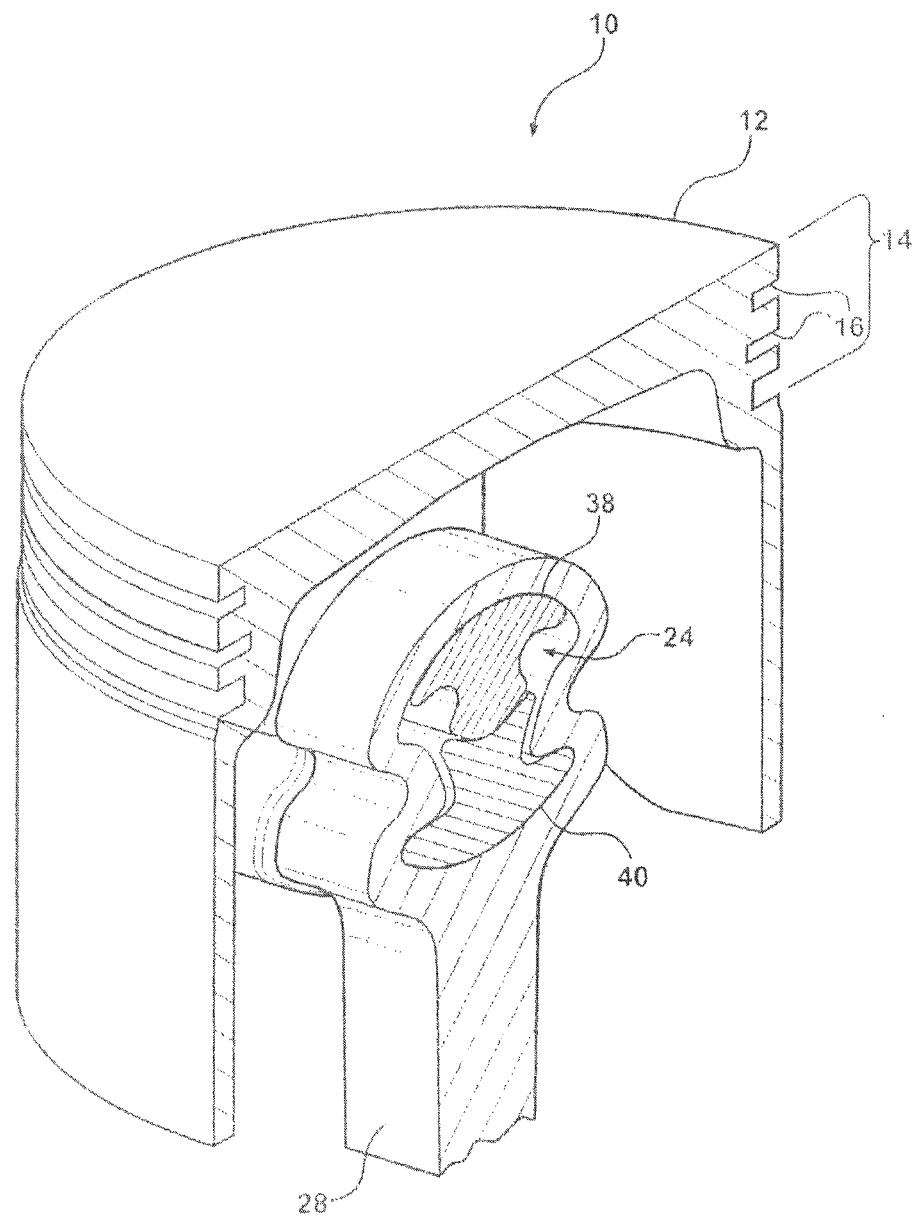
FIG. 1 is a partial cross-sectional perspective view of a piston assembly constructed according to one aspect of the invention.

Referring in more detail to the drawings, FIG. 1 illustrates a piston assembly 10 constructed according to one aspect of the invention. The piston assembly 10 has a piston body 12, preferably either cast or forged, although any preferred method of construction could be used, having an upper crown portion 14 formed with ring grooves 16 to accommodate one or more rings (not shown). A pair of pin bosses 18 (FIG. 2A) depend from the upper crown portion 14 and terminate in pin bores 20 axially aligned with one another along an axis 22. The pin bores 20 are configured for receipt of a wrist pin 24 therein. The pin bosses 18 have inner and outer faces 26, 27, wherein the inner faces 26 are laterally spaced from one another a distance sufficient to receive a connecting rod 28, and more particularly, a small end 30 of the connecting rod 28 therebetween. The small end 30 of the connecting rod 28 has a wrist pin or small end bore 32 extending along the axis 22 and is configured for receipt of the wrist pin 24 therethrough. Accordingly, the wrist pin 24 couples the connecting rod 28 to the piston body 12. The wrist pin 24 is constructed as a two-piece member, and thus, has first and second wrist pin members, also referred to as portions, constructed from separate pieces of material, referred to hereafter simply as first and second portions 38, 40, respectively. The first and second portions 38, 40 are elongate members that are arranged to extend substantially parallel to the axes 22, 34 through the small end bore 32 and are configured to move relative to one another during reciprocation of the piston body 12 in the cylinder bore. The relative movement between the first and second portions 38, 40 is a reduced sliding motion, and thus, any relative sliding movement between the first and second portions 38, 40 is minimized. Further, as discussed in more detail below, the relative movement between the pin bores 20 and the first portion 38 of the wrist pin 24 is prevented, and the relative movement between the small end bore 32 and the second portion 40 of the wrist pin 24 is prevented, thereby minimizing or negating the potential for wear therebetween. In addition, the ability to maintain a lubrication film between the components while moving relative to one another, i.e. first and second portions 38, 40, is maximized, thereby further reducing the potential for wear therebetween, while also minimizing the potential for generating noise and heat.

Figure 3:
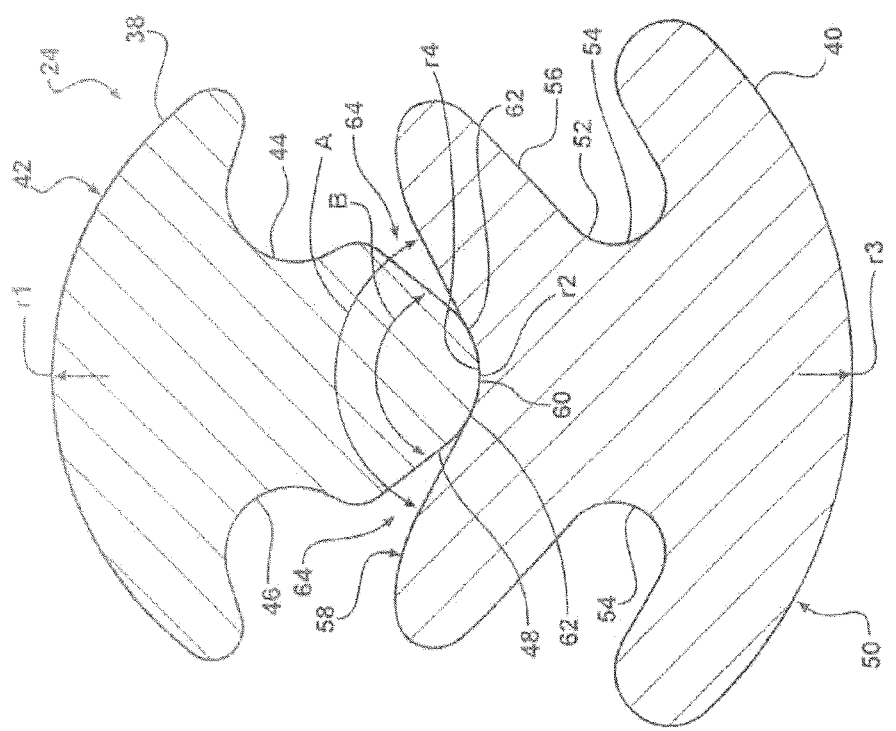
FIG. 3 a cross-sectional view of a wrist pin constructed according to one presently preferred aspect of the assembly.

As shown in FIG. 3, both the first portion 38 and second portion 40 of the wrist pin 24 are non-circular in lateral cross-section, and thus, non-cylindrical along their lengths. Accordingly, the wrist pin 24 does not have a contiguous, cylindrical outer surface. Any suitable manufacturing process could be used to construct the initial shaped of the first and second portions 38, 40, such as a roll forming extrusion process, for example. The first portion 38 has a convex upper surface 42 having a first radius r1 extending along a predetermined arc between opposite ends 43, 45, wherein the arc is represented as being less than 180 degrees, and between about 60-145 degrees, for example. The upper surface 42 transitions radially inwardly to a necked down portion 44 to provide a pair of opposite longitudinally extending recessed flutes or pockets 46, such that the first portion 38 is generally mushroom-shaped in lateral cross-section. The necked down portion 44 extends to an end providing a convex fulcrum 48 having a second radius r2 extending along the length of the first portion 38. The second radius r2 can be provided as a constant or varying radius, as desired.

The upper surface 42 of the first portion 38 can remain as an "initially formed" surface, and thus, does not require secondary machining processes. However, if secondary operations are desired, such as machining, the upper surface 42 can remain relatively rough, having a surface finish of no more than about Ra 4 µm, for example.

The convex fulcrum 48 of the first portion 38, in contrast to the upper surface 42, is preferably formed as a smooth surface, such as in a machining operation, e.g. grinding. The resulting surface finish of the convex fulcrum is preferably no greater than about Ra 2 µm, for example.

The region of the necked down portion 44 other than the convex fulcrum 48 can remain as initially formed. Accordingly, the pockets 46 can remain as initially formed, thereby not requiring any secondary machining.

Figure 4:
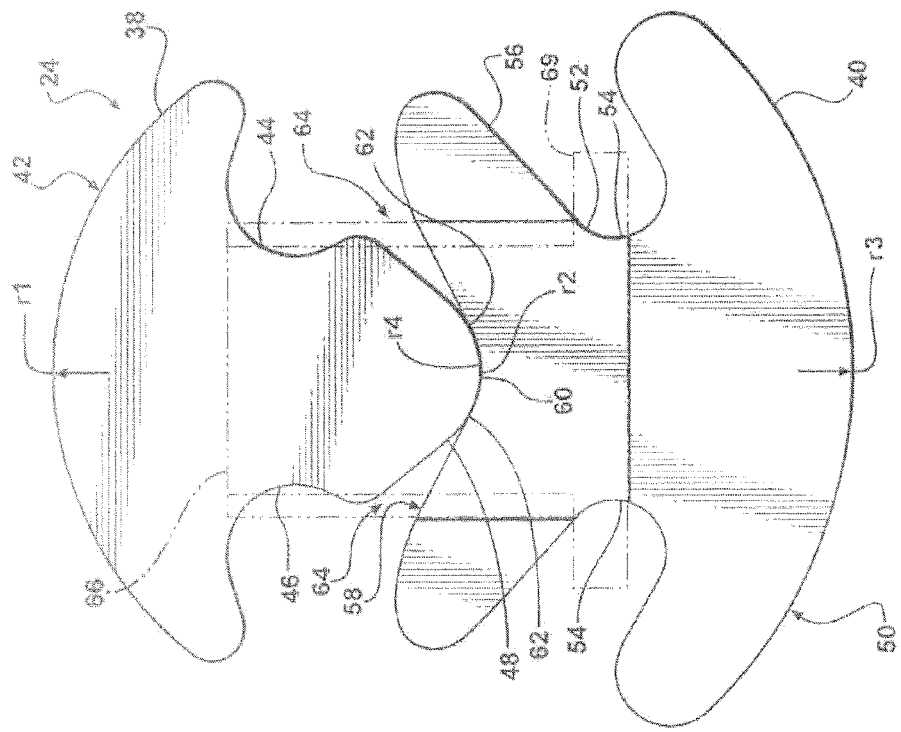
FIG. 4 is an end view of the wrist pin of FIG. 2A with a lock member removed.

The second portion 40 has a convex lower surface 50 having a third radius r3 extending along a predetermined arc between opposite ends 51, 53, wherein the arc is represented as being less than 180 degrees, and in one example, as being between about 60-145 degrees. The lower surface 50 transitions radially inwardly to a necked down portion 52 to provide a pair of opposite longitudinally extending recessed flutes or pockets 54. The necked down portion 52 transitions to a flared, generally Y-shaped portion 56 providing a concave surface 58 extending along the length of the second portion 40. The concave surface 58 can be provided as a constant or varying radius, as desired, and is preferably shaped to provide a reduced sliding motion relative to the convex fulcrum 48 of the first portion 38. As shown in FIGS. 3 and 4, the concave surface 58 can be provided having a constant radius portion r4, wherein the radius r4 is equal to or substantially equal to the radius r2, thereby establishing a single elongate contact patch 62 between the first and second portions 38, 40 over an arc of up to about 40 degrees, which in turn, minimizes the contact pressure therebetween.

The concave surface 58, aside from establishing a predetermined shape and size contact patch with the convex fulcrum 48, also provides lubrication pockets 64 laterally outwardly from the contact patch 62. Accordingly, the concave surface 58 is formed having an included angle A that is greater than an included angle B formed by the convex fulcrum 48. As such, a substantial space is provided between the mating first and second portion 38, 40 in which lubrication can collect and remain in use, thereby further inhibiting or preventing scuffing, while also acting to dampen noise, as discussed further below.

The lower surface 50 of the second portion 40 can remain as an "initially formed" surface, and thus, does not require secondary machining processes. However, if secondary operations are desired, such as machining, the lower surface 50 can remain relatively rough, having a surface finish no greater than about Ra 4 μm, for example.

The concave surface 58 of the second portion 40, in contrast to the lower surface 50, is preferably formed as a smooth surface, such as in a machining operation, e.g. grinding. The resulting surface finish of the concave surface 58 is preferably no greater than about Ra 2 μm, for example.

The region of the necked down portion 52 can remain as initially formed. Accordingly, the pockets 54 can remain as initially formed, thereby not requiring any secondary machining.

Figure 2B:
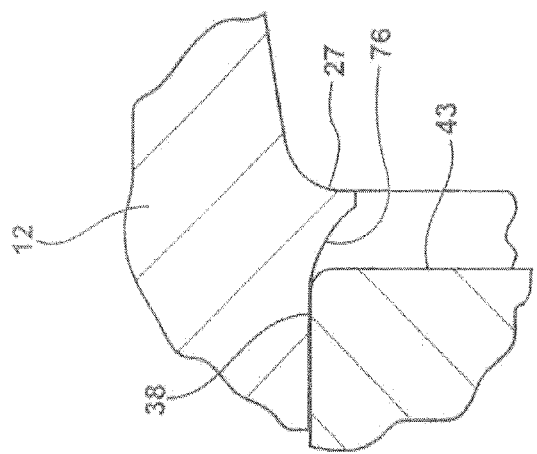
FIG. 2B is an alternate embodiment of the encircled area 2B of FIG. 2A.
Figure 2A:
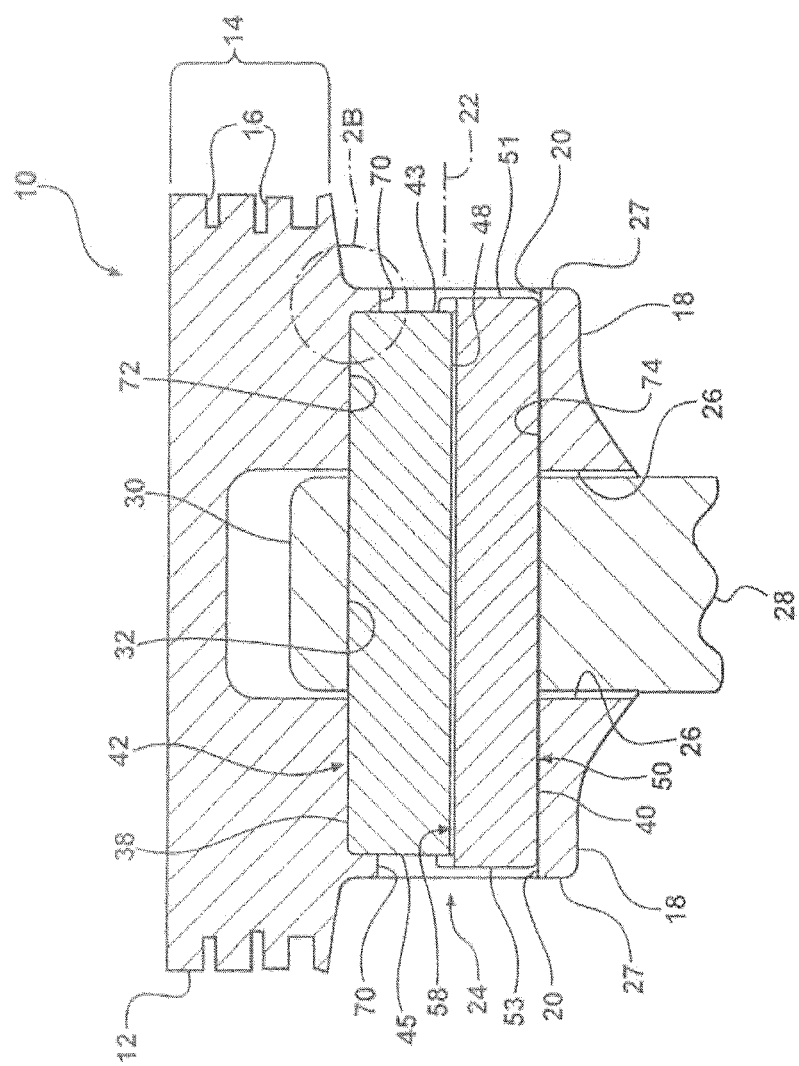
FIG. 2A is a cross-sectional view taken along a central pin axis of the piston assembly of FIG. 1.
Figure 5:
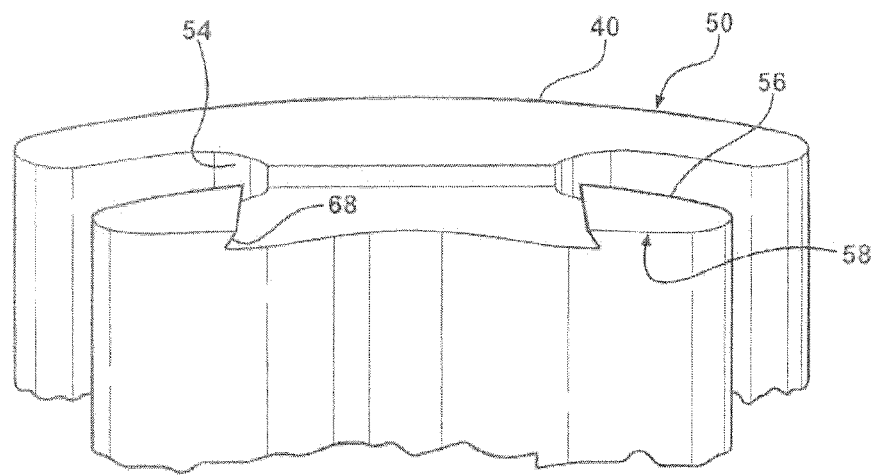
FIG. 5 is a perspective end view of one portion of the wrist pin of FIG. 4.
Figure 6:
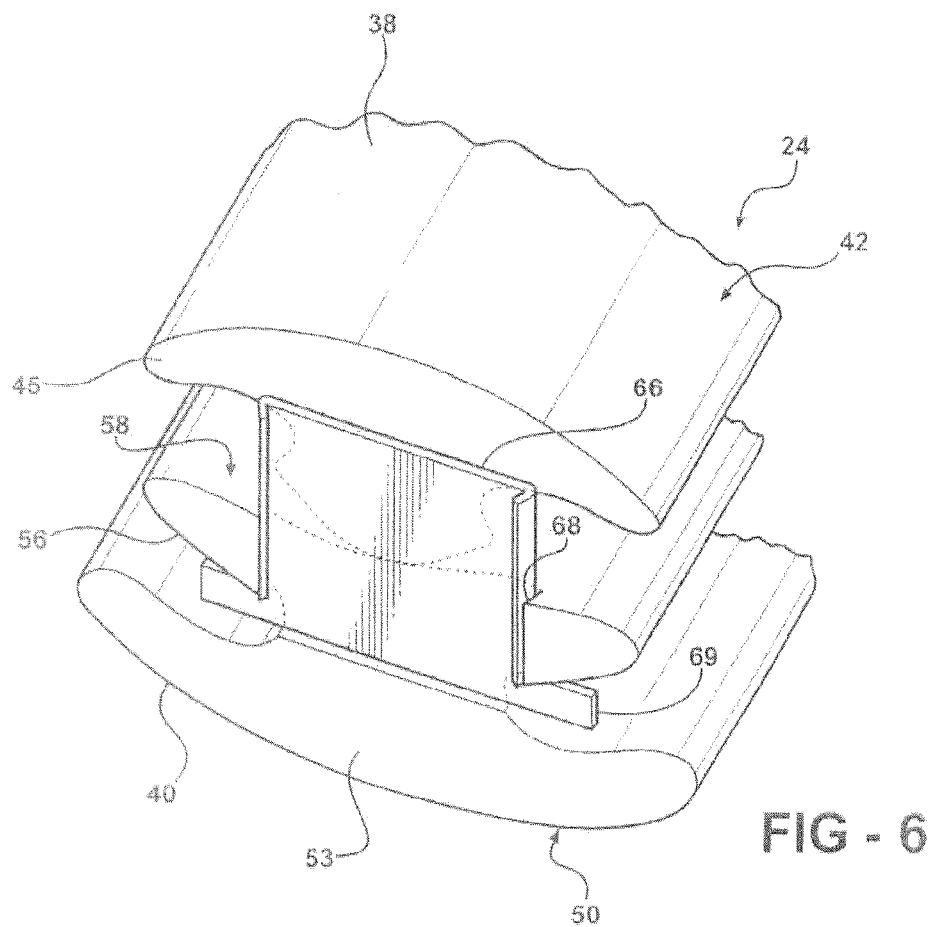
FIG. 6 is a perspective end view of the wrist pin of FIG. 4 with the lock member capturing one portion of the wrist pin axially relative to another portion of the wrist pin.

As shown in FIG. 2A, by way of example and without limitation, the first and second portions 38, 40 can be formed having different lengths, wherein the first portion 38 is shown as being slightly shorter than the second portion 40. With the second portion 40 ends 51, 53 extending beyond the ends 43, 45 of the first portion 38, lock devices, such as spring or lock washers 66, for example, can be incorporated on the ends 51, 53 of the longer second portion 40 to retain the second portion 40 against axial movement relative to the first portion 38. As shown in FIGS. 4-6, by way of example and without limitation, the lock washers 66 can be received in slots 68 recessed into the opposite ends 51, 53 of the second portion 40. The slots 68 are shown here as having a dovetail type form, such that the washers 66, upon being snapped into the slots 68, are maintained therein against axial disassembly. To prevent relative radial movement of the washers 66 within the slots 68, the washers 66 can be formed with laterally extending tabs 69 that are received and radially captured in the pockets 54. The washers 66 are suitably sized to extend radially outwardly from the concave surface 58 to abut or present barriers to the opposite ends 43, 45 of the first portion 38.

As shown in FIG. 2A, the pin bores 20 can be formed having a stepped region 70 extending partially about their circumference. The stepped regions 70 are formed adjacent the outer faces 27, such that a lip or flange is formed extending radially inwardly from the pin bores 20. The flange formed by the stepped regions 70 facilitates maintaining the first and second portions 38, 40 of the wrist pin 24 in a fixed axial location within the pin bores 20. By way of example and without limitation, the stepped regions 70 are shown here as extending radially inwardly from an upper portion 72 of the pin bores 20 to capture the first portion 38 of the wrist pin axially, thereby preventing the first portion 38 from moving axially, while a lower portion 74 of the pin bores 20 are formed as straight through bores without a stepped surface. The upper or first portion 38 of the wrist pin 24 can be inserted into the pin bores 20 and positioned upwardly between the laterally spaced stepped regions 70, and then the lower or second portion 40 of the wrist pin 24 can be inserted into the pin bores 20 to radially maintain the first portion 38 within the pin bores 20 between the stepped regions 70. The second portion 40 can then be maintained axially within the pin bores 20 by assembling the lock washer 66 in the recessed slots 60 of the second portion 40, for example.

It should be recognized that the pin bores 20 could be formed without the stepped regions 70 and as circumferential through bores, and that standard snap rings could be disposed within snap ring grooves (not shown) within the pin bores 20 to fix the wrist pin 36 against relative axial movement out from the pin bores 20. In addition, as shown in FIG. 2B, by way of example and without limitation, rather than the stepped regions 70 being provided, a contoured surface 76 could be formed within the pin bores 20. The contoured surfaces 76 are shown here as converging slightly toward the outer faces 27 such that the openings formed at the outer faces of the pin bores is at least slightly reduced from the size of the pin bores axially inwardly from the outer faces 27. The contoured surfaces 76 are represented here as being curvilinear to maintain the first portion 38 of the wrist pin against axial movement out of the pin bores 20. As with the stepped regions 70, the contoured surfaces 76 extend only partially about the circumference of the respective pin bores 20 such that the lower portion 74 is formed as an axially straight through bore.

Figure 8:
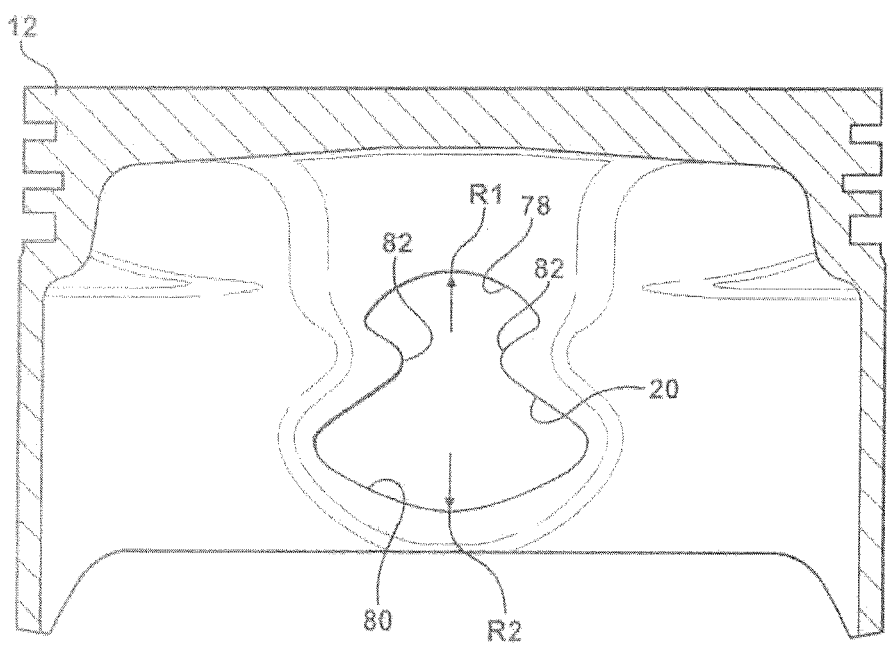
FIG. 8 is a view similar to FIG. 7 with the wrist pin and connecting rod of the assembly removed.

As shown in FIG. 8, the pin bores 20, in one example according to a first contemplated construction of the piston assembly 10, are non-cylindrical with one portion, represented here as an upper portion 78, by way of example and without limitation, having a first concave radius of curvature R1, and another portion, represented here as a lower portion 80 diametrically opposite the upper portion 78, by way of example and without limitation, having a second concave radius of curvature R2, wherein R1 is generally equal to or less than R2. The upper and lower portions 78, 80 each extend less than 180 degrees about the complete respective bore 20 and are generally symmetrical on opposite sides of the axis 22. Each portion 78, 80 terminates at a radially inwardly extending protrusion 82. The protrusions 82 interrupt the radius contour of the upper and lower portions 78, 80 and extend radially inwardly in mirrored relation to one another. As such, the bores 20 are generally hour-glass shaped or FIG. 8 shaped.

Figure 7:
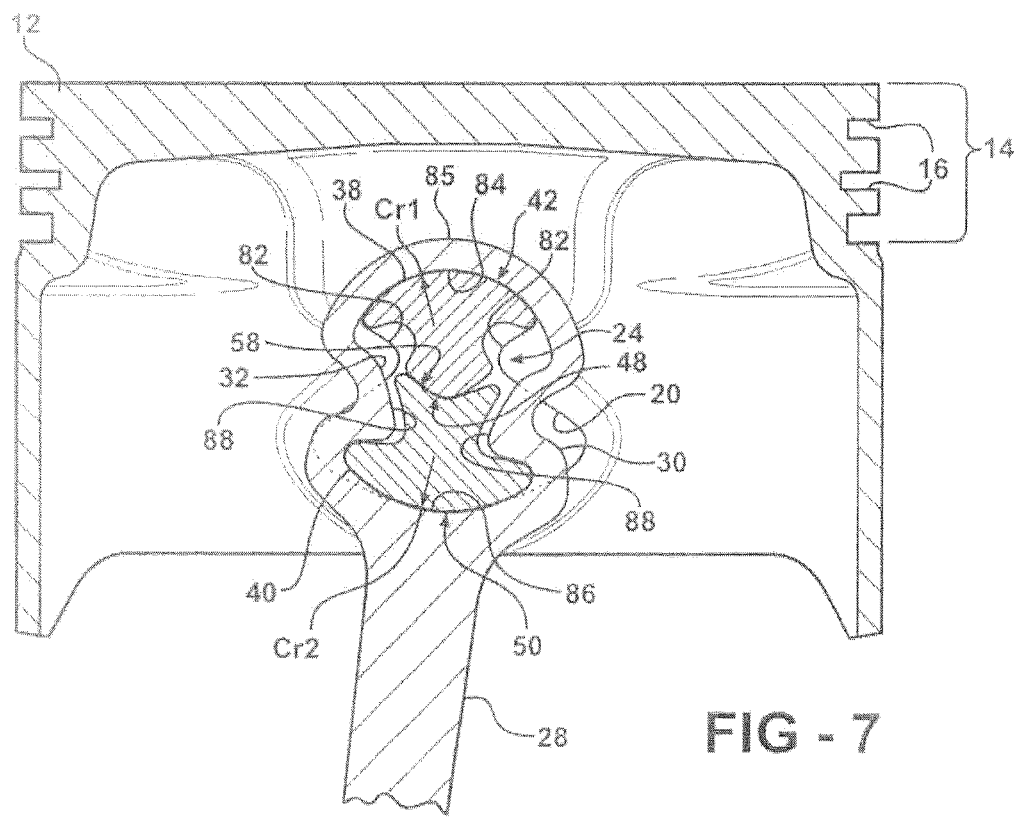
FIG. 7 is a cross-sectional side view of the piston assembly of FIG. 1.

As shown in FIG. 7, the small end bore 32 of the connecting rod 28 is non-cylindrical, with one portion, represented here as an upper portion 84 forming an end 85 of the connecting rod 28, having a first concave radius of curvature Cr1, and another portion, represented here as a lower portion 86 diametrically opposite the upper portion 84 having a second concave radius of curvature Cr2. The upper portion curvature Cr1, in the embodiment shown, by way of example and without limitation, is generally equal to or less than the lower portion curvature Cr2. The upper and lower portions 84, 86 each extend less than 180 degrees about the small end bore 32 and transition to a radially inwardly extending surface, wherein the radially inwardly extending surface is reference hereafter as an intermediate portion 88. The intermediate portion 88 is formed in a generally symmetrical fashion on opposite sides of the small end bore 32, and thus, the small end bore 32 has a generally mirrored shape across an axis of its length, and is generally hour-glass shaped or FIG. 8 shaped.

The connecting rod 28 is preferably cast or forged from steel, although other materials having a suitable strength for the intended application are contemplated, such as aluminum, for example, and other methods of construction, e.g. machining, are contemplated. The connecting rod small end bore 32 can remain as manufactured, and thus, can have a relatively rough surface finish, preferably no greater than about Ra 4 μm, for example. Accordingly, no secondary operations are necessary in the manufacture of the small end bore 32. In addition, the small end bore 32 does not require a supplemental bearing surface or material, and thus, is preferably provided as a bushingless bore, thereby being economical in manufacture.

In use, the piston assembly 10, such as in a four-stroke engine, though the assembly is equally well suited for a two-stroke engine, reciprocates through a full-stroke (intake, compression, combustion and exhaust) with no relative movement occurring between the first portion 38 of the wrist pin 36 and the pin bores 20, nor between the second portion 40 of the wrist pin 24 and the small end bore 32. The first portion 38 of the wrist pin 36, being received and substantially fixed in the upper portions 78 of the pin bores 20, is constrained against relative rotational movement within the pin bores 20 by the protrusions 82 of the pin bores 20. The upper portions 78 of the pin bores 20 span the same or substantially the same arc as the upper surface 42 of the first portion 38, with the protrusions 82 of the pin bores 20 acting as stops or barriers against relative rotational movement of the wrist pin first portion 38. In addition to the barriers provided by the protrusions 82, the relatively rough surfaces of the upper portion 78 of the pin bores 20 and the upper surface 42 of the first portion 38 while engaging one another and act to resist relative rotation through relatively high friction therebetween.

In addition, the second portion 40 of the wrist pin 36, being received in the lower portion 86 of the connecting rod small end bore 32, is substantially fixed and constrained against rotational movement relative to the small end bore 32 by the intermediate portion 88 of the small end bore 32. The lower portion 86 of the small end bore 32 spans the same or substantially the same arc as the lower surface 50 of the second portion 40, with the intermediate portion 88 of the small end bore 32 acting as a stop or barrier against relative rotational movement of the wrist pin second portion 40. In addition to the barrier provided by the intermediate portion 88, the relatively rough surfaces of the lower portion 80 of the pin bores 20 and the lower surface 50 of the second portion 40 while engaging one another act to resist relative rotation through relatively high friction therebetween.

Accordingly, the relative movement between the connecting rod 28 and the piston body 12 occurs between the first portion 38 of the wrist pin 24 and the second portion 40 of the wrist pin 24, wherein the relative movement is a reduced sliding motion of the concave surface 58 against the convex fulcrum 48. The reduced sliding motion takes place over the full length of contact between the concave surface 58 and the convex fulcrum 48, which is represented here as extending across the entire length between the pin bores 20. Accordingly, the area of contact between the relatively movable first and second portions 38, 40 provides relatively low contact pressure between the convex fulcrum 48 and the concave surface 58, and has been found to be, in one example without limitation, wherein AISI 4140 steel was used to construct the pins, about 320 MPa. As such, the potential for scuffing and wear between the relatively movable first and second portions 38, 40 of the two component wrist pin 24 is minimized or substantially eliminated. The potential for wear and noise generation is further reduced by the presence of lubrication within the elongate lubrication pockets 64 extending between the pin bores 20 on both sides of the convex fulcrum 48. Given the relatively low contact pressures between the first and second portions 38, 40, a sufficient lubrication film thickness is provided and maintained between the first and second portion 38, 40 to further reduce the potential for wear. In addition to minimizing wear, the lubrication film between the convex fulcrum 48 and the concave surface 58 acts to dampen noise.

Throughout the complete stroke of the piston assembly 10, different compression and tension loads are transmitted throughout the piston assembly 10. For example, during an initial intake stroke, the connecting rod 28 is placed in tension. While in tension, the connecting rod 28 pulls on the upper surface 42 of the wrist pin first portion 38 which is constrained against relative rotation with the pin bores 20. Accordingly, any relative rotation between the connecting rod 28 and the wrist pin 24 occurs between the upper surface 42 of the first portion 38 and the upper portion 84 of the small end bore 32. However, the tensile forces generated are relatively low, and thus, the potential for wear between the relatively rotating surfaces 42, 84 is minimal. The same holds true for any relative rotational movement between the lower portion 80 of the pin bores 20 and the lower surface 50 of the wrist pin second portion 40.

The connecting rod 28 is also placed in compression, which is the condition under which the most severe loading, and thus, the greatest potential for wear exists, such as during the compression, combustion and exhaust strokes. While under compression, the connecting rod 28 and piston body 12 are being pushed toward one another, with the wrist pin 24 transferring the loading therebetween. The wrist pin first portion 38 encounters compression forces in the pin bores 20 and the wrist pin second portion 40 encounters compression forces in the connecting rod small end bore 32. With both the first and second wrist pin portions 38, 40 being placed under compressive loads acting toward one another, and with the first portion 38 being fixed against rotation in the pin bores 20 and the second portion 40 being fixed against rotation in the small end bore 32, the first and second wrist pin portions 38, 40 are caused to move in a reduced sliding motion between the convex fulcrum 48 and the concave surface 58, respectively. With the movement being a minimal sliding type motion, and with the reduced pressures resulting across the entire axial length of the sliding surfaces, as discussed above, and further, with the enhanced levels of lubrication and lubrication film being maintained across the entire axial length of the sliding surfaces, the potential for wear and noise is greatly reduced.

As such, in accordance with another aspect of the invention, a method of forming an enhanced lubrication interface between first and second wrist pin members 38, 40 of a wrist pin 24 is provided. The method includes collecting sufficient oil regardless of the existing clearance value between the wrist pin 24 and a piston pin bore 20, and regardless of an existing clearance value between the wrist pin 24 and a small end bore 32 of a connecting rod 28. Further, the method includes increasing the contact area between the first and second wrist pin members 38, 40 to reduce contact pressure and enable improved lubrication and damping characteristics between the first and second wrist pin members 38, 40; and then, providing a lubrication interface between the first and second wrist pin members 38, 40 to maintain supplied oil with limited contact pressure between the first and second wrist pin members 38, 40, and further, providing a reduced sliding speed between compatible first and second wrist pin materials 38, 40 to prevent their surface damage.

Obviously, many modifications and variations of the present invention are possible in light of the above teachings. It is, therefore, to be understood that within the scope of the appended claims, the invention may be practiced otherwise than as specifically described.

What is claimed is:

1. A piston, comprising:
a piston body having a pair of laterally spaced pin bosses with pin bores aligned with one another along an axis and configured for receipt of a wrist pin having separate first and second portions, said first and second portions each extending lengthwise between said pin bores, with at least one of said pin bores so as to be received by both pin bores having a feature to prevent relative rotation of the first wrist pin portion.

2. The piston of claim 1 wherein said pin bores are configured to allow relative rotation of the second wrist pin portion.

3. The piston of claim 1 wherein said feature extends radially inwardly toward said axis.

4. The piston of claim 3 wherein said feature is provided in each pin bore by a pair of protrusions extending radially inwardly generally toward said axis.

5. The piston of claim 1 further including providing a feature in said pin bores to prevent relative axial movement of the first wrist pin portion in said pin bores.

6. A method of constructing a piston, comprising:
forming a piston body having an upper crown and a pair of laterally spaced pin bosses depending from said upper crown;
forming a wrist pin bore in each of said pin bosses for receipt of a wrist pin having first and second portions extending lengthwise between the pin bores so as to be received by both pin bores; and
providing a feature within at least one of said wrist pin bores to prevent relative rotation of the first wrist pin portion therein.

7. The method of claim 6 further including forming a portion of each wrist pin bore for relative rotation with the second wrist pin portion.

8. The method of claim 6 further including providing said feature by forming a protrusion extending radially into said at least one wrist pin bore.

9. The method of claim 8 further including forming said protrusion as a monolithic piece of material with said pin boss.

10. The method of claim 6 further including forming each of said wrist pin bores having one portion with a first radius of curvature and a second portion with a second radius of curvature, said first radius of curvature being different than said second radius of curvature.

* * * * *